US008875954B2

(12) United States Patent
Carta

(10) Patent No.: US 8,875,954 B2

(45) Date of Patent: Nov. 4, 2014

(54) DISPENSER WITH INTEGRAL END STOP STRUCTURE

(75) Inventor: Lamberto Carta, Pescara (IT)

(73) Assignee: Aptar Italia S.p.A., San Giovanni Teatino (CH) (IT)

( * ) Notice: Subject to any disclaimer, the term of this patent is extended or adjusted under 35 U.S.C. 154(b) by 126 days.

(21) Appl. No.: 13/257,814

(22) PCT Filed: Mar. 17, 2010

(86) PCT No.: PCT/IT2010/000114

§ 371 (c)(1), (2), (4) Date: Sep. 20, 2011

(87) PCT Pub. No.: WO2010/113198

PCT Pub. Date: Oct. 7, 2010

(65) Prior Publication Data

US 2012/0006854 A1 Jan. 12, 2012

(30) Foreign Application Priority Data

Apr. 1, 2009 (IT) ............................ RM2009A0152

(51) Int. Cl.

*G01F 11/00* (2006.01)

*B05B 11/00* (2006.01)

(52) U.S. Cl.

CPC ......... *B05B 11/3074* (2013.01); *B05B 11/3023* (2013.01); *B05B 11/3067* (2013.01)

USPC ...................................................... 222/321.2

(58) Field of Classification Search

CPC B05B 11/30; B05B 11/3001; B05B 11/3023; B05B 11/3025; B05B 11/3066; B05B 11/3067

USPC ............ 222/322, 321.1, 321.2, 321.7, 321.9, 222/320

See application file for complete search history.

(56) References Cited

U.S. PATENT DOCUMENTS 4,109,832 A * 8/1978 Kutik et al. .................. 222/318
4,183,449 A * 1/1980 Blake ......................... 222/321.2

(Continued)

FOREIGN PATENT DOCUMENTS

| | | | |
|---|---|---|---|
| DE | 20 2007 017 692 | U1 | 3/2008 |
| EP | 0 953 381 | A2 | 11/1999 |
| EP | 1 565 270 | A1 | 8/2005 |

OTHER PUBLICATIONS

International Search Report, dated Jun. 14, 2010, from corresponding PCT application.

*Primary Examiner* — Patrick M Buechner

(74) *Attorney, Agent, or Firm* — Young & Thompson

(57) ABSTRACT

A dispenser includes a hollow body (2) able to be inserted into a bottle, a piston (7) able to slide in the body (2) between raised and lowered position, a hollow stem (8) able to slide in the body (2) to command the actuation of the piston (7), opening and closing element (10) active between the stem (8) and the piston (7) to put in fluid communication the cavity of the stem (8) with the interior of the body, a retaining ring integral with the body (2) and inserted within it, elastic element active between the ring and the stem to contrast the free sliding of the stem and of the piston within the body. The dispenser further includes an end stop structure integral with the body and positioned in a bottom portion thereof to define an end stop arrest for the sliding of the stem within the body.

12 Claims, 3 Drawing Sheets

(56) References Cited

U.S. PATENT DOCUMENTS

| | | | | | |
|---|---|---|---|---|---|
| 4,776,498 | A | * | 10/1988 | Maerte et al. | 222/321.4 |
| 5,503,306 | A | * | 4/1996 | Knickerbocker | 222/321.1 |
| 5,505,343 | A | * | 4/1996 | Knickerbocker | 222/321.1 |
| 5,692,649 | A | * | 12/1997 | Schwab | 222/321.3 |
| 5,992,704 | A | * | 11/1999 | Jager-Waldau | 222/341 |
| 6,045,008 | A | * | 4/2000 | Gonzalez Fernandez et al. | 222/153.13 |
| 6,193,112 | B1 | * | 2/2001 | Santagiuliana | 222/153.13 |
| 6,206,245 | B1 | * | 3/2001 | Bonningue | 222/321.7 |
| 6,209,761 | B1 | * | 4/2001 | Bonningue | 222/321.7 |
| 6,332,561 | B1 | * | 12/2001 | Garcia et al. | 222/321.3 |
| 7,410,079 | B2 | * | 8/2008 | Kuwahara et al. | 222/321.2 |
| 8,573,448 | B2 | * | 11/2013 | Ding | 222/153.13 |
| 2002/0100772 | A1 | * | 8/2002 | Bonningue | 222/321.2 |
| 2004/0069811 | A1 | * | 4/2004 | Perignon et al. | 222/321.7 |
| 2004/0134935 | A1 | * | 7/2004 | Bougamont | 222/321.7 |
| 2005/0279770 | A1 | * | 12/2005 | Moretti | 222/321.7 |
| 2006/0151541 | A1 | * | 7/2006 | Pares Montaner et al. | 222/321.2 |
| 2006/0243748 | A1 | * | 11/2006 | Rampini et al. | 222/321.2 |
| 2008/0164344 | A1 | | 7/2008 | Lompech et al. | |

* cited by examiner

DISPENSER WITH INTEGRAL END STOP STRUCTURE

TECHNICAL FIELD

The present invention relates to a dispenser, i.e. a dosing device able to be applied to the neck of a bottle to dispense the liquid contained therein.

BACKGROUND ART

In particular, the present invention relates to a dispenser of the type comprising a containment body with substantially axial-symmetric geometry, internally hollow and able to be inserted in the neck of a bottle.

The containment body is provided in a first end with an orifice for the entry of the liquid product present in the bottle. Said orifice is opened or closed by a ball free to slide within the containment body, in particular within a dosing chamber included therein.

The dosing chamber is defined by the space present between a piston, guided by an internally hollow stem, able to slide within the containment body and the bottom portion (where the orifice is positioned) of the containment body.

Between piston and stem are present means for opening and closing the inner cavity of the stem in such a way as selectively to place in fluid communication the interior of the stem with the dosing chamber.

The stem is guided in its travel by a retaining ring, integral with the containment body, which also serves the abutment function for the travel of the piston.

In other words, the retaining ring defines the upper limit of the dosing chamber, preventing the piston from being able to exit from the dosing chamber itself.

When the piston creates an overpressure within the dosing chamber, the cavity of the stem is in fluid communication with the dosing chamber and the fluid present in the dosing chamber rises along the stem and is dispensed by a spout associated therewith.

In this configuration, the ball is lowered and occludes the aforementioned orifice because of the overpressure in the dosing chamber.

When the piston creates a vacuum within the dosing chamber the cavity of the stem is not in fluid communication with the dosing chamber and fluid is moved from the bottle into the dosing chamber.

In this configuration, the ball is raised and leaves open the aforementioned orifice because of the vacuum in the dosing chamber.

In this type of dispenser, the sliding of the piston within the containment body takes place contrasting the action of a spring whose function is to maintain the piston in raised position.

In particular, exercising a compression action on the stem, the piston slides within the dosing chamber, reducing its dimensions and hence creating an overpressure within it.

Ceasing the compression action on the stem, the aforementioned spring brings the piston back to the raised position, expanding the dimensions of the dosing chamber and hence creating a vacuum therein.

In these types of prior art dispensers, it is often preferred to prevent the spring from lying in the dosing chamber (thus acting between the stem or the piston and the bottom of the dosing chamber), in such a way as to prevent the spring from coming into contact with the fluid to be dispensed (which, as stated, moves from the bottle to the dosing chamber and thence to the dispensing spout through the cavity of the stem).

For this purpose, the spring is placed in so-called "external" position, in such a way that it acts between the stem and the retaining ring.

Therefore, the compression force exercised on the stem is unloaded on the retaining ring and thence it is transmitted to the containment body, and lastly to the bottle.

It should be noted that the retaining ring is made integral with the containment body thanks to the insertion of an annular edge of the ring within an undercut obtained in the containment body.

The retaining ring shall also assure a fluid tightness between its own outer wall and the wall of the containment body, to prevent the liquid contained in the bottle from escaping because of the overpressures that may be generated between the interior of the bottle and the environment in occasional situations (depressurized environment) or accidental situations (crushing of the bottle).

However, the prior art dispensers described above present some drawbacks.

During the operations for mounting the dispenser, in particular during the fitting of the dispensing spout, the compression forces necessary to insert the dispenser on the stem are contrasted by the retaining ring, i.e. they are unloaded on the containment body through the coupling between retaining ring and containment body itself.

In these conditions, to prevent an excessive pressure of the stem from thrusting the piston too deep into the dosing chamber, damaging it, the spring positioned between stem and retaining ring is arranged in such a way that the configuration of maximum compression of the spring coincides with the position of the maximum insertion of the piston in the dosing chamber (i.e. with the position of maximum lowering of the piston), with the disadvantage of an additional constraint in the selection of design parameters, e.g. diameter and number of coils, and the consequent use of oversized or excessively rigid springs, with respect to the simple function of exercising a returning action on the piston.

With solutions of this kind, if an excessive assembly force is exercised, the retaining ring could be damaged and not assure its functionalities (especially the fluid tightness with the inner wall of the containment body) for which it was designed.

DISCLOSURE OF INVENTION

In this context, the technical task at the basis of the present invention is to propose a dispense that overcomes the aforementioned drawbacks of the prior art.

In particular, an object of the present invention makes available a dispenser in which the retaining ring cannot be damaged accidentally because of excessive compression actions on the stem.

An additional object of the present invention is to propose a dispenser that does not require particular springs for its operation.

Yet another object of the present invention, lastly, is to prevent occasional malfunctions that can derive from the possible sticking of the ball in the structure that limits mobility.

The specified technical task and the objects specified are substantially achieved by a dispenser, comprising the technical characteristics exposed in one or more of the appended claims.

DESCRIPTION OF THE DRAWINGS

Further characteristics and advantages of the present invention shall become more readily apparent from the indicative, and therefore not limiting, description of a preferred but not exclusive embodiment of a dispenser, as illustrated in the accompanying drawings in which.

DESCRIPTION OF THE ILLUSTRATIVE EMBODIMENT

Figure 1:
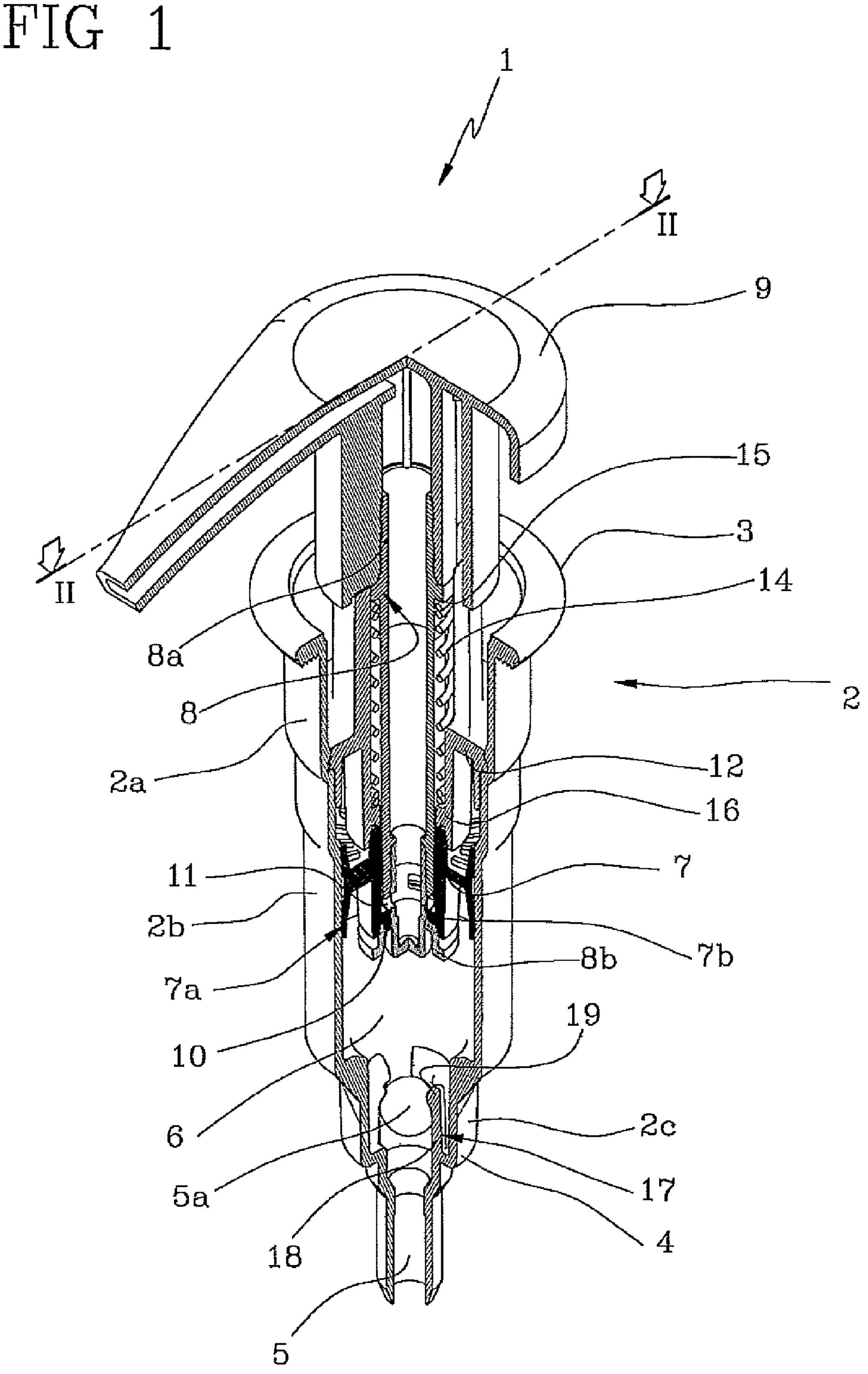
FIG. 1 shows a perspective, partially sectioned view of a dispenser in accordance with the present invention.

With reference to the accompanying drawings, a dispenser in accordance with the present invention is indicated with the number 1.

The dispenser 1 comprises a hollowing containment body 2 able to be inserted in a bottle.

The containment body 2 has axial-symmetric geometry and it comprises an upper portion 3 and a bottom portion 4.

The upper portion 3 is open and its function is to enable the insertion into the hollow body 2 of the elements (described farther on) which comprise the dispenser.

The bottom portion 4 is provided with an orifice 5 through which the liquid contained in the bottle enters the containment body 2.

The orifice 5 is engaged by a ball 5*a* whose function is to open or close the orifice 5 in ways that will be clarified farther on.

The containment body 2 is substantially shaped as a funnel.

In particular, the containment body 2 comprises a first section 2*a* that develops starting from the upper portion 3 towards the bottom portion 4, and a second 2*b* positioned underneath the first section 2*a*.

The second section 2*b* defines a dosing chamber 6 for the dispenser 1.

Underneath the dosing chamber 6 develops a third section 2*c* from which the orifice 5 extends.

The three aforementioned sections have mutually different transverse dimensions, in such a way as to define the aforesaid funnel configuration of the containment body 2.

In particular, the second section 2*b*, the one defining the dosing chamber 6, is substantially cylindrical.

Figure 2:
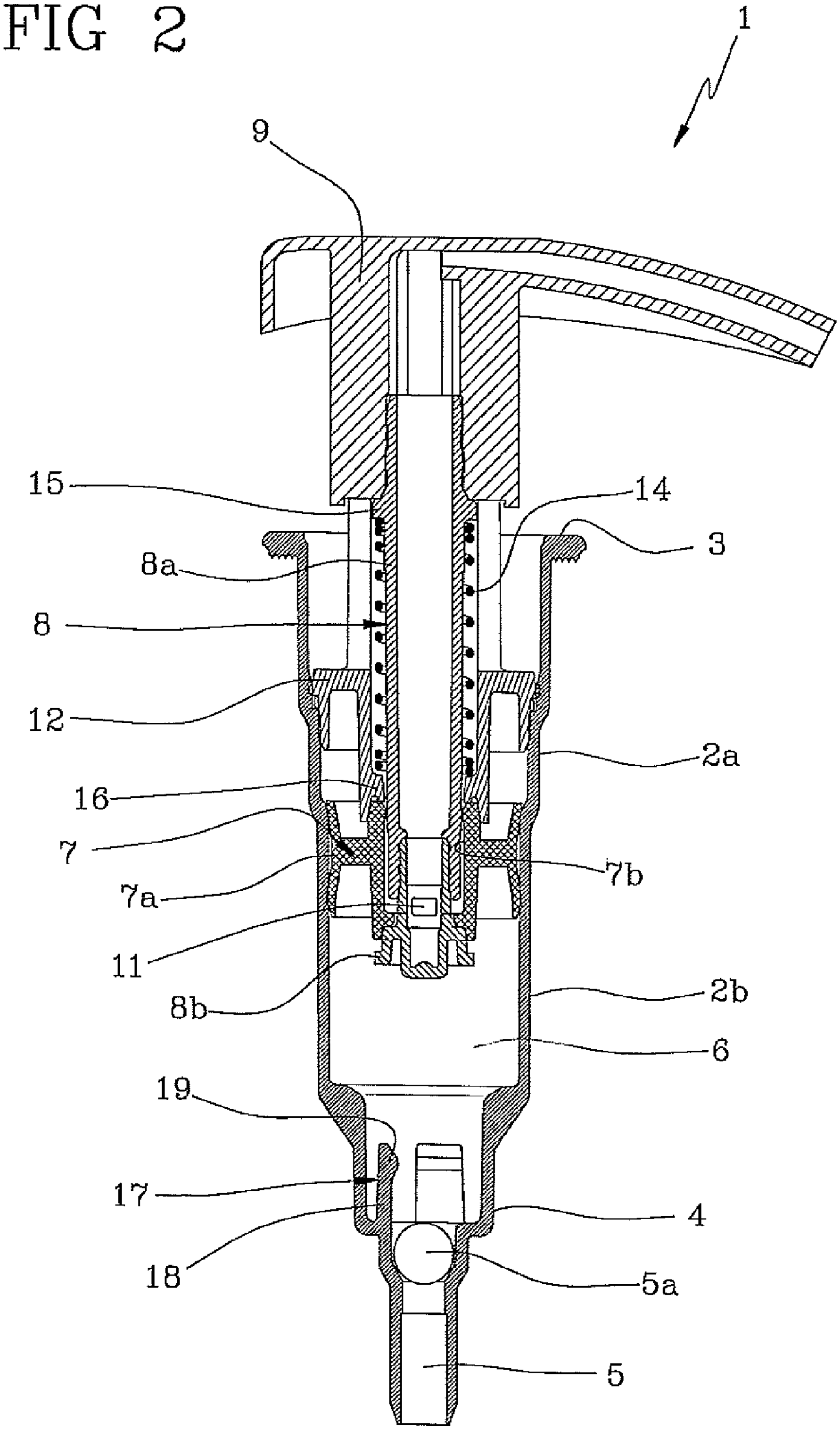
FIG. 2 is a section according to plane II-II of the dispenser of FIG. 1.
Figure 3:
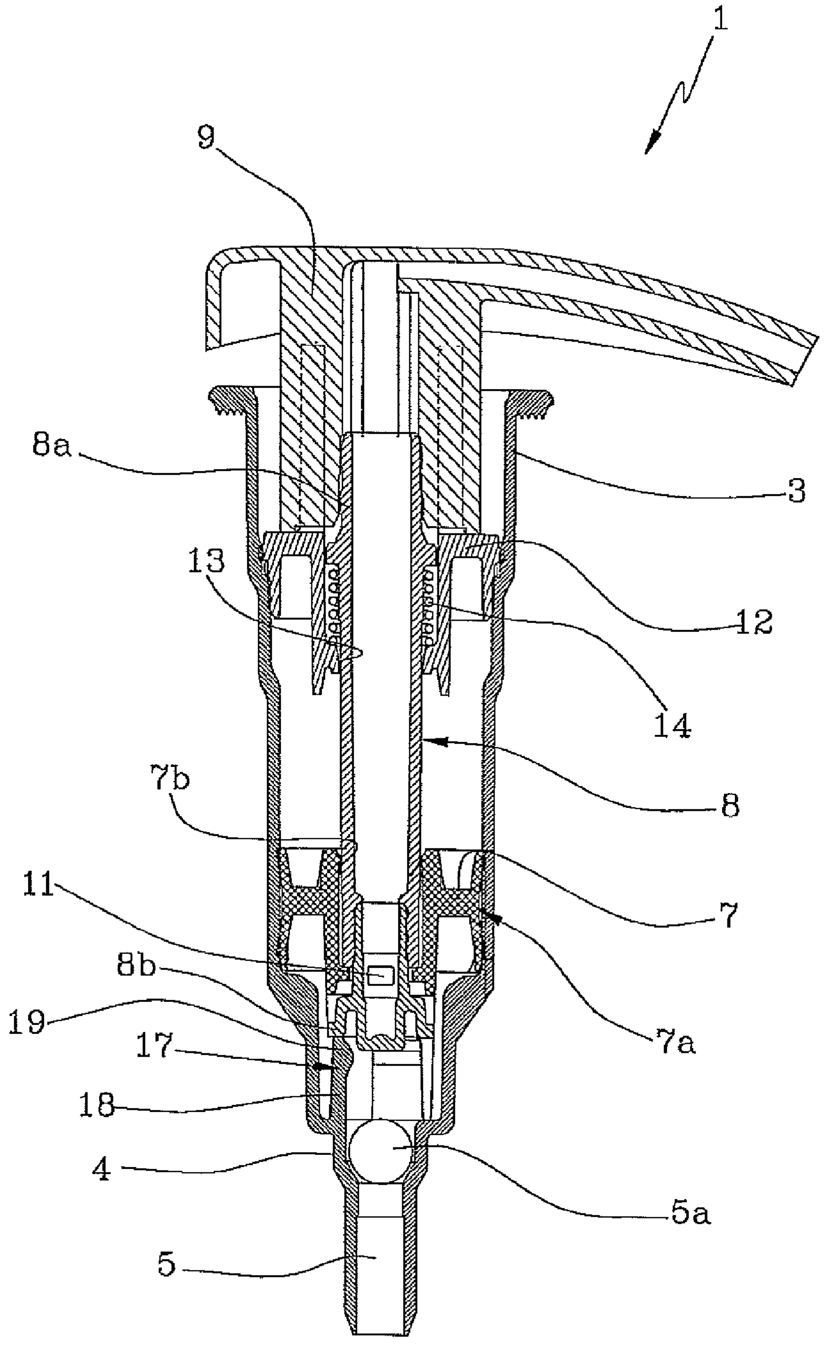
FIG. 3 is the section of FIG. 2 with the dispenser in a different operating configuration.

Within the hollow body 2 is provided a piston 7 movable between a raised position (illustrated in FIG. 2) and a lowered position (illustrated in FIG. 3).

The piston 7 comprises an outer surface 7*a* able to contact the inner wall of the second portion 2*b* of the hollow body 2.

The outer surface 7*a* of the piston 7 slides within the dosing chamber 6 between the aforementioned raised position in which the volume of the dosing chamber is greatest, and the aforementioned lowered position, in which the volume of the dosing chamber is smallest.

The outer surface 7*a* of the piston 7 slides providing fluid tightness along the inner wall of the second portion, in such a way that liquid present in the dosing chamber cannot escape through the sliding coupling between piston 7 and dosing chamber 6. The dispenser 1 further comprises a hollow stem 8 able to slide within the containment body 2 between a raised position (FIG. 2) and a lowered position (FIG. 3).

The stem 8 commands the operation of the piston 7, i.e. it actuates it within the dosing chamber 6.

The stem 8 also serves the function of transferring, through its cavity, liquid present inside the dosing chamber 6 to a spout 9 that dispenses the liquid to a user.

In particular, opening and closing means 10 are active between the stem 8 and the piston 7 to place selectively in fluid communication the cavity of the stem 8 with the interior of the containment body 2, in particular with the dosing chamber 6.

The opening and closing means 10 comprise at least one window 11, preferably two opposite windows, for the passage of liquid obtained on the lateral wall of the stem 8.

The stem 8 is partially able to slide relative to the piston 7 to occlude the window 11 with a wall 7*b* of the piston 7 and to make the window 11 emerge relative to the piston 7.

In particular, the stem 8 is inserted in a through hole, delimited by the wall 7*b*, of the piston 7.

The stem is free to slide within the through hole by such a quantity as to make the window 11 emerge within the dosing chamber 6.

The terminal part of the stem 8 is therefore closed, in such a way that the liquid in the dosing chamber 6 can enter the cavity of the stem 8 only through the window 11. In the preferred embodiment, the relative motion between stem 8 and piston 7 is delimited by upper and lower abutments positioned on the stem 8.

In the illustrated embodiment of the invention, the stem 8 comprises two mutually joined half-parts 8*a*, 8*b*.

The first half-part 8*a* is fastened to the dispensing spout 9; the second half-part 8*b* bears the window 11.

In alternative embodiments, not illustrated herein, the stem 8 is made of a single piece.

To guide the stem 8 in its travel within the containment body 2, the dispenser 1 comprises a retaining ring 12 integral with the containment body 2 and inserted therein.

The retaining ring 12 is positioned in the first section 2*a* of the body 2 and it has a hole 13 for the passage of the stem 8.

Between the retaining ring 12 and the stem 8 are present elastic means 14 to contrast the free sliding of the stem (and hence of the piston) within the containment body 2. In particular, the elastic means 14 are constituted by a spring which is active between a shoulder 15 obtained on the stem 8 and a shoulder 16 obtained in the retaining ring.

The spring 14 is positioned concentrically to the stem 8 and externally thereto.

Acting on the spout 9, in particular pressing it, the stem 8 and the piston 7 translated within the dosing chamber 6.

In a first phase of said translation, the piston 7 remains motionless both because of the friction of the wall 7*a* of the piston with the wall of the dosing chamber 6, and as a result of the overpressure that is generated in the liquid contained in the dosing chamber because of the reduction in volume of said chamber.

In this phase the stem 8 translates relative to the piston 7 facing the window 11 (situated at the lower end of the stem 8).

The subsequent travel of the stem 8 drives with it the piston 7 determining a compression of the liquid present in the dosing chamber 6 which flows through the window 11 and hence through the spout 9 until it flows out to the exterior (operating configuration shown in FIG. 3).

As a result of the release of the spout 9 by the user, the entire system returns to the resting position (shown in FIG. 2) thanks to the spring 14.

During the rising phase, the stem 8 moves before the piston 7 (held by the friction with the walls of the dosing chamber 6) thereby closing the window 11.

In this way, the liquid present in the stem 8 and in the spout 9 is prevented from being aspirated into the dosing chamber 6 again.

The translation during the return travel of the piston 7 in the dosing chamber 6 creates a depression inside the dosing chamber 6 which determines the aspiration of liquid through the orifice 5 of the containment body 2.

At each dispensing operation, a volume of air equal to the dispensed liquid enters into the bottle through compensation passages obtained in the dispenser 1 (not illustrated) which place in communication the interior of the bottle with the external environment.

Advantageously, the dispenser 1 comprises an end stop structure 17 integral with the body 2 to define an end stop arrest for the sliding of the stem 8 within the containment body 2.

The end stop structure 17 contacts the stem 8 in the lowered position.

In this way, when the spout 9 is pressed, both during the mounting of the dispenser, and during its use, the compression force exercised is discharged through the stem 8 to the end stop structure and hence to the containment body 2.

This assures that the retaining ring 12 is not overloaded with stresses to be transferred to the containment body 2, preserving the integrity and functionality of the retaining ring 12.

It should also be noted that the end stop structure 17, exercising a mechanical arrest to the travel of the stem 8, allows to use springs 14 which do not necessarily have to reach a configuration of maximum compression in the lowered position of the stem 8.

In other words, the end stop structure 17 determines the maximum travel of the stem 8 within the containment body 2, whilst in prior art dispensers this function is performed by the spring 14 (as explained above), when it is not limited to the piston alone to avoid damaging it.

The end stop structure 17 is active on an end surface of the stem 8 (or of the second half-part 8*b* thereof), as shown in FIG. 3.

In particular, the end stop structure 17 comprises at least one end stop element 18 that develops away from the bottom portion 4 of the containment body 2.

The end stop element 18 develops parallel to the axis of symmetry of the containment body 2, in such a way as to work with loads (transferred from the stem 8) directed parallel to its own development.

In this way, the force transmissible to the element 18 that works mainly with compression loads is maximized.

The end stop element 18 is fastened to the bottom portion 4 of the containment body 2 and it is preferably constructed in a single piece therewith.

The end stop element 18 develops within the third section 2*c* of the containment body 2 and it does not involve the dosing chamber 6.

In the preferred embodiment of the invention, the end stock structure 17 comprises three end stop elements 18 distanced from each other by 120°.

In particular, each end stop element 18 is substantially a prismatic, preferably right body.

Preferably, each end stop element 18 comprises a shoulder 19 to retain the ball in the bottom portion 4 of the containment body 2.

In particular, the shoulder 19 is obtained at one end of the end stop element 18 opposite to the end fastened to the containment body 2.

The shoulders 19 prevent the ball from entering into the dosing chamber 6, retaining it in the vicinity of the orifice 5 around which the end stop elements 18 develop.

In this way, a ready intervention of the ball 5*a* in the occlusion of the orifice 5 is assured.

It should be noted that the lower portion of the stem 8 is so shaped as to be able to be partially inserted into the end stop elements 18, in such a way as to remove the ball 5*a* from any blocking condition which may have occurred accidentally.

The invention achieves the proposed objects.

When the spout 9 is pressed, both during the mounting of the dispenser, and during its use, the compression force exercised is discharged through the stem 8 to the end stop structure 17 and hence to the containment body 2.

This assures that the retaining ring 12 is not overloaded with stresses to be transferred to the containment body 2, preserving the integrity and functionality of the retaining ring 12.

Moreover, the end stop structure 17, exercising a mechanical arrest to the travel of the stem 8, allows to use springs 14 which do not necessarily have to reach a configuration of maximum compression in the lowered position of the stem 8.

The invention also achieves an additional advantage.

The end stop structure 17 assures, if the stem is constituted by two half-parts, the completion of the coupling of the lower half-part on the upper half-part, if said fastening did not take place correctly or completely during the assembly of the piece.

The invention claimed is:

1. Dispenser comprising:

a hollow containment body able to be inserted in a bottle, a piston able to slide within said containment body between a raised position and a lowered position;

a hollow stem able to slide within said containment body between a raised position and a lowered position to command the actuation of said piston;

opening and closing means active between said stem and said piston in order selectively to place in fluid communication the cavity of said stem with the interior of the containment body;

a retaining ring integral with said containment body and inserted within it, elastic means active between said retaining ring and said stem to contrast the free sliding of said stem and said piston within the containment body;

a ball active on an orifice of the containment body positioned in a bottom portion of the containment body to allow a passage of fluid from a bottle to the containment body, said ball opening and closing said orifice to allow or to inhibit the passage of liquid from the bottle to the containment body; and an end stop structure that is integral with said containment body to define an end stop for arresting the sliding of the stem within the containment body, said end stop structure being active on a lower end surface of said stem for contacting said stem in the lowered position; said end stop structure comprising three end stop elements attached to a bottom wall of the containment body and mutually distanced by 120°, wherein each end stop element extends away from said bottom wall prevalently along a main direction parallel to an axis of symmetry of the containment body and comprises a shoulder to retain said ball in a bottom portion of the containment body between the three end stop elements, wherein the stem is configured in such a way that, in a configuration of abutment between said lower end surface of the stem and the end stop structure, a lower portion of the stem is partially inserted below an uppermost surface of the end stop structure and between the shoulders of the three stop elements so as to remove the ball from any blocking condition which may have occurred accidentally, said lower end surface of the stem and the lower portion of the stem being integrated in the same part of the stem.

2. Dispenser as claimed in claim 1 wherein said opening and closing means comprise at least one window for the passage of liquid obtained on the lateral wall of the stem; said stem being able to partially slide relative to said piston to occlude said window with a wall of said piston and to make said window emerge relative to said piston.

3. Dispenser as claimed in claim 2 wherein said stem comprises two half-parts; one half-part fastened to a dispensing spout and a second half-part bearing said window.

4. Dispenser as claimed in claim 2 wherein a lower surface of said second half-part is active on said end stop structure.

5. Dispenser as claimed in claim 1, wherein, the lower end surface of the stem is at a level higher than the lowermost portion of the stem.

6. A dispenser comprising:

a dispensing spout;

a hollow containment body with a funnel shape and an upper portion and a bottom portion, and comprising i) a first section that develops starting from the upper portion and extending towards the bottom portion, ii) a second section positioned underneath the first section, the second section defining a dosing chamber for the dispenser, and iii) a third section below the second section, the first, second and third sections having mutually different outer transverse dimensions so as to define the funnel shape, the containment body being insertable in a bottle containing liquid;

an orifice provided in the bottom portion, through which orifice the liquid contained in the bottle enters the containment body, the orifice extending in the third section of the containment body;

a piston that slides within said containment body between a raised position and a lowered position, the piston comprising an outer surface that contacts an inner wall of the second portion of the hollow body, the outer surface of the piston sliding within the dosing chamber between the raised position in which a volume of the dosing chamber is greatest, and the lowered position in which the volume of the dosing chamber is smallest, wherein the outer surface of the piston sliding provides fluid tightness along the inner wall of the second portion in such a way that liquid present in the dosing chamber cannot escape through sliding coupling between piston and dosing chamber;

a hollow stem that slides within the containment body between a raised position and a lowered position to command the actuation of said piston, the stem having a cavity that serves to transfer the liquid present inside the dosing chamber to the dispensing spout;

upper and lower abutments positioned on the stem;

opening and closing means active between the stem and the piston to place selectively in fluid communication the cavity of the stem with the interior of the containment body including the dosing chamber, wherein a relative motion between the stem and the piston is delimited by the upper and lower abutments positioned on the stem;

a retaining ring integral with said containment body and positioned in the first section of the body, the retaining ring including a hole that provides passage of the stem;

elastic means active between said retaining ring and said stem to contrast the free sliding of said stem and said piston within the containment body;

a ball in the bottom portion and engaging the orifice to open and close the orifice to allow a passage of the liquid from the bottle to the containment body, said ball opening and closing said orifice to allow or to inhibit the passage of the liquid from the bottle to the containment body; and an end stop structure integral with said containment body and defining an end stop for arresting the sliding of the stem within the containment body, said end stop structure being active on a lower end surface of said stem for contacting said stem in the lowered position and presenting a mechanical arrest to the travel of the stem and determining a the maximum travel of the stem within the containment body, said end stop structure comprising at least one stop element attached to a bottom wall of the containment body, each end stop element extending away from said bottom wall prevalently along a main direction parallel to an axis of symmetry of the containment body and comprising an upper shoulder to retain said ball in the bottom portion of the containment body between the upper shoulder and the bottom wall of the containment body, wherein the stem is configured in such a way that, in a configuration of abutment between said lower end surface of the stem and an uppermost surface of the end stop structure, a lowermost portion of the stem is partially inserted below the uppermost surface of the end stop structure interior to the shoulder of each stop element so as to remove the ball from any blocking condition which may have occurred, the lower end surface of the stem and the lowermost portion of the stem being integrated in a same part of the stem, the lower end surface of the stem being at a level higher than the lowermost portion of the stem.

7. The dispenser as claimed in claim 6, wherein said opening and closing means comprises a window for the passage of the liquid obtained on a lateral wall of the stem, said stem being able to partially slide relative to said piston to occlude said window with a wall of said piston and to make said window emerge relative to said piston, a terminal part of the stem being closed so that the liquid in the dosing chamber can enter the cavity of the stem only through the window.

8. The dispenser as claimed in claim 7, the stem comprises two half-parts, one half-part fastened to the dispensing spout and a second half-part bearing said window.

9. The dispenser as claimed in claim 8, wherein a lower surface of said second half-part is active on said end stop structure.

10. The dispenser as claimed in claim 6, wherein the elastic means comprise a spring active between a shoulder on the stem and a shoulder in the retaining ring, the spring positioned concentrically to the stem and externally thereto pressing on the spout, the stem, and the piston translated within the dosing chamber.

11. The dispenser as claimed in claim 6, wherein, said end stop structure comprising three end stop elements attached to the bottom wall of the containment body and mutually distanced by 120°, and wherein the stem is configured in such a way that, in the configuration of abutment between said lower end surface of the stem and the end stop structure, the lowermost portion of the stem is partially inserted between the shoulders of the three stop elements so as to remove the ball from any blocking condition.

12. The dispenser as claimed in claim 6, wherein, said end stop structure comprising plural, spaced-apart end stop elements attached to the bottom wall of the containment body, and wherein the stem is configured in such a way that, in the configuration of abutment between said lower end surface of the stem and an uppermost surface of the end stop structure, the lowermost portion of the stem is partially inserted below the uppermost surface of the end stop structure interior to the shoulder of each stop element so as to remove the ball from any blocking condition.

* * * * *